United States Patent [19]

Miller

[11] Patent Number: 4,900,562

[45] Date of Patent: Feb. 13, 1990

[54] FEED INTAKE LIMITING COMPOSITION COMPRISING CALCIUM HYDROXIDE FOR CATTLE

[75] Inventor: Bill L. Miller, Fort Dodge, Iowa

[73] Assignee: Cooperative Research Farms, Charlottesville, N.Y.

[21] Appl. No.: 216,968

[22] Filed: Jul. 11, 1988

[51] Int. Cl.$^4$ .............................................. A23K 1/00
[52] U.S. Cl. .......................................... 426/2; 426/74; 426/623; 426/626; 426/634; 426/636; 426/807
[58] Field of Search ....................... 426/2, 69, 74, 623, 426/630, 636, 626, 807

[56] References Cited

U.S. PATENT DOCUMENTS

| | | | |
|---|---|---|---|
| 3,669,676 | 6/1972 | Karr | 99/7 |
| 4,182,755 | 1/1980 | McNeff | 424/147 |
| 4,197,319 | 4/1980 | Betz et al. | 426/2 |
| 4,225,621 | 9/1980 | Lanter et al. | 426/2 |
| 4,234,604 | 11/1980 | Betz et al. | 426/2 |
| 4,311,713 | 1/1982 | Betz et al. | 426/2 |
| 4,431,675 | 2/1984 | Schroeder | 426/69 |

FOREIGN PATENT DOCUMENTS 1356954  6/1974  United Kingdom ................ 426/626

OTHER PUBLICATIONS

Dialog Accession No. 0784001 File 53: CAB Abstracts (1972"1973), Abstracting Ali et al., Zeitschrift fur Tierphysiologie Tierernahrung und Futtermittelkunde (1977) 39 (4), pp. 173–182.
Jerry Edward Jensen, "Restricting Intake of Energy Supplements Fed to Yearling Steers Grazing Irrigated Pasture", Mar. 1979.

Primary Examiner—R. B. Penland
Attorney, Agent, or Firm—Kinney & Lange

[57] ABSTRACT

A feed intake limitor includes the use of calcium hydroxide to limit intake of a feed supplement. The calcium hydroxide is incorporated into the feed supplement in an amount that effectively limits intake of the feed supplement.

13 Claims, No Drawings

FEED INTAKE LIMITING COMPOSITION COMPRISING CALCIUM HYDROXIDE FOR CATTLE

BACKGROUND OF THE INVENTION

1. Field of the Invention

The present invention relates to feed intake limiting compositions, and in particular, it relates to feed intake limiting compositions which limit intake of a feed supplement by cattle. The present invention also relates to a method for limiting the intake of food supplement by self-feeding cattle.

2. Description of the Prior Art

Most animals raised for slaughter are fed in a free choice environment. By a free choice environment is meant that feed is placed in a feed bunk or other suitable container and the animal eats until it is satisfied or until the feed bunk is empty.

Feed supplements are offered to cattle in addition to roughage sources such as pasture or hay. Typically, the feed supplement is placed on a daily or twice daily basis in a feed bunk either manually or automatically and the animals are permitted to feed at will. Some animals eat more than their share of feed supplement while other are denied their share of feed supplement. Overeating by animals is generally wasteful since an animal will eat more feed supplement than it can efficiently metabolize. Individually administering a predetermined amount of feed supplement to individual animals where large numbers of animals are involved is not a practical alternative.

There have been attempts to include various compositions into feed supplements to control consumption by individual cattle. High levels of salt (sodium chloride) have been used for many years to limit free choice feed supplement consumption by cattle. However, for salt to be effective as a feed intake limitor, high levels of salt such as 18% by weight must be used. In addition, it has been found that cattle have become used to salt so that even higher levels, as high as 50%, have had to be used to limit the intake of feed supplements. Such high levels of salt are deleterious to pasture land, especially where animals congregate.

Other compositions have also been tried as intake limiting compositions. For example, gypsum (calcium sulfate) has also been tried as a feed intake limitor.

Patents which describe intake limiting compositions or feed supplements which contain intake limiting compositions include:

| Karr et al | 3,669,676 |
| McNeff | 4,182,755 |
| Betz | 4,197,319 |
| Lanter et al | 4,225,621 |
| Betz et al | 4,234,604 |
| Betz et al | 4,311,713 |

Another information source relating to feed intake limitors is a Master of Science thesis presented to the University of Nebraska in 1979 by Jerry Edward Jensen entitled "Restricting Intake of Energy Supplements Fed to Yearling Steers Grazing Irrigated Pastures". Jensen's thesis discloses several supplement intake regulators including but not limited to salt, fat, calcium, chloride, phosphoric acid, gypsum, and aluminum sulfate.

However, none of the immediately above-mentioned patents or other information sources describe an effective feed supplement intake limitor which is less expensive than the other limitors currently available, mixes easily with feed supplements without requiring special handling or procedures, is readily available on a commercial basis, does not have any or minimal deleterious effects on the cattle, and effectively limits consumption of feed supplement to a selected amount.

SUMMARY OF THE INVENTION

The present invention includes a feed supplement for animals containing a feed intake limiting composition. The feed intake limiting composition is calcium hydroxide in an amount effective to limit intake to a predetermined amount or at an amount greater than 6% by dry weight of the feed supplement. A further aspect of the present invention includes a method of using the feed supplement containing the feed intake limiting composition described above for animals.

DETAILED DESCRIPTION OF THE PREFERRED EMBODIMENTS

The present invention includes a feed supplement containing calcium hydroxide as a feed intake limiting composition. The calcium hydroxide is present in an amount which is effective in limiting the intake of the feed supplement by animals such as ruminants.

The optimum amount of feed supplement eaten by ruminants will generally be the intake amount necessary for the feed supplement's desired benefits. Such benefits include satisfying the basic nutritional and metabolic requirements of the ruminant and maintaining the animal's weight or inducing weight gain. Variations of the predetermined optimum amount will depend upon the type of animal as well as the environmental conditions present. For example, the type and availability of forage and selective grazing of the animal may vary the animal's daily intake of feed supplement. Average daily intakes of feed supplement range from about 2 pounds to about 8 pounds per head with a preferred intake of about 3 pounds to about 5 pounds per head.

The feed supplement containing a feed intake limiting composition of the present invention is preferably given to self-feeding cattle and is known to work well with beef cattle but may also be effective for dairy cattle, swine, and poultry.

The feed supplement of the present invention is a mixture of materials intended to meet the complete nutritional requirements of the animal, except for ruminants which also require a roughage source for proper feed utilization. The feed supplement includes primarily farinaceous materials such as grain, corn, or by-products and blends thereof. Other conventional adjuvants include vitamin and mineral supplements, calcium sources, nitrogen sources such as urea, and other additives such as antibiotics.

The feed intake limiting composition of the present invention is calcium hydroxide $(Ca(OH)_2)$. Calcium hydroxide is well-known by its common name, hydrated lime, and is readily available commercially since it has many commerical and industrial uses. Calcium hydroxide is manufactured in the form of either a fluffy, dry, white powder, a putty or an aqueous suspension. The actual amount of calcium hydroxide used in the feed supplement to limit feed intake is determined by the degree of intake control desired.

The feed supplement may also contain an oil, such as mineral oil, which serves to decrease the dusty conditions and other undesirable properties caused by both the calcium hydroxide and farinaceous materials during the mixing process.

Forage or roughage materials such as hay, grass, silage, haylage, and/or corn cobs are fed along with the feed supplement for the best results. Given that the availability of various roughage sources will be variable depending upon the geographic locality, local vegetation, time of year, and other factors, it is intended that the present invention not be limited to any particular roughage source used in combination with the feed supplement containing the feed intake limiting composition.

The feed supplement containing the feed intake limiting composition is mixed in any convenient manner which ensures uniform distribution in the feed supplement and it is fed in any form which is suitable for feeding the animals. The feed supplement is pelletized, is compressed into large blocks, or is in meal form. Once mixed, calcium hydroxide will remain well distributed throughout the feed supplement.

Calcium hydroxide is relatively easy to handle under field conditions. In particular, calcium hydroxide is easy to handle in comparison to other feed intake limitors such as sodium hydroxide, which can pose significant health problems.

The manner in which the feed supplement containing the feed intake limiting composition of the present invention is fed to the animals is not intended to be limited. Any manner suitable for feeding animals is satisfactory.

The present invention is further illustrated in the following examples which describe various formulations of the feed supplement containing the feed intake limiting composition but are not intended to limit the present invention.

EXAMPLE 1

Twenty (20) head of crossbred steers, weighing approximately 1050 pounds each, were randomly divided into four groups. Each group consisted of five animals.

Three of the groups were fed a grain-based pasture feed supplement containing different levels of hydrated lime as a feed intake limitor. The fourth group was fed essentially the same grain-based pasture feed supplement with 18% salt as a feed intake limitor with the salt being used as a control to determine the effect of different levels of hydrated lime.

The grain-based formulation for each of the four groups of animals is set forth below in Table 1.

TABLE 1

| Formulation of Grain-Based Supplement | | | | |
|---|---|---|---|---|
| | Animal Group Number | | | |
| | 1 | 2 | 3 | 4 |
| Dehydrated Alfalfa Meal | 5.00 | 5.00 | 5.00 | 5.00 |
| Ground Corn | 70.30 | 65.30 | 60.30 | 57.95 |
| Wheat Middlings | 15.00 | 15.00 | 15.00 | 15.00 |
| Limestone | 1.73 | 1.73 | 1.73 | 1.73 |
| Dicalcium Phosphate | .90 | .90 | .90 | .90 |
| Salt | .65 | .65 | .65 | 18.00 |
| Urea | .67 | .67 | .67 | .67 |
| Magnesium Sulfate | .45 | .45 | .45 | .45 |
| Cattle Vitamin | .15 | .15 | .15 | .15 |
| Hydrated Lime | 5.00 | 10.00 | 15.00 | 0.00 |
| Trace Mineral Premix | .15 | .15 | .15 | .15 |
| | 100.00 | 100.00 | 100.00 | 100.00 |
| Actual Analysis: | | | | |

TABLE 1-continued

| Formulation of Grain-Based Supplement | | | | |
|---|---|---|---|---|
| | Animal Group Number | | | |
| | 1 | 2 | 3 | 4 |
| Moisture, % | 10.68 | 11.13 | 10.51 | 9.85 |
| Protein, % | 10.97 | 10.39 | 9.81 | 10.30 |
| Calcium, % | 3.25 | 5.67 | 8.06 | 1.55 |
| Phosphorus, % | .56 | .55 | .51 | .53 |
| Salt, % | .90 | .77 | .77 | 16.53 |

Each group of animals was fed the indicated grain-based feed supplement with feed intake limitor for a period of 21 days. The hydrated lime feed supplements included levels of 5%, 10%, and 15% for animals in groups 1 through 3, respectively. All levels were calculated on a dry matter basis. The steers were each provided 8.8 pounds of fresh feed supplement daily. Supplements were fed employing an automated Calan feeder system so that individual animal consumption records could be attained. Each animal could access only one feeder, as animals were identified electronically by a transducer positioned around the animal's neck. Refused feed was determined daily so that actual daily supplement consumption could be ascertained for each animal period. All steers were confined to one-half acre dry lot. Alfalfa haylage and screened corn cobs in a 2:1 ratio were provided from a common bunk feeder. The feed supplement of the present invention was offered in meal form. Table 2 set forth below shows the average daily intake for each animal group.

TABLE 2

| Animal Group Number | Intake Limiting Compound | Level (%) | Average Daily Intake of Feed (lbs.) |
|---|---|---|---|
| 1 | Hydrated Lime | 5.0 | 4.58 |
| 2 | Hydrated Lime | 10.0 | .67 |
| 3 | Hydrated Lime | 15.0 | .59 |
| 4 | Salt | 18.0 | 2.79 |

Consumption by the steers of feed supplement containing 10% and 15% hydrated lime levels was substantially reduced. The 10% and 15% hydrated lime levels were significantly different than the 5% hydrated lime level (P less than 0.05), and the 5% hydrated lime level was significantly different than 18% salt level (P less than 0.05). As will be noted, the consumption of feed was reduced below levels of the control group (salt used as intake feed limitor).

EXAMPLE 2

A set of twenty (20) head of crossbred steers, weighing an average of 700 pounds, were randomly assigned in three sequential trials. The three trials are labeled A, B, and C in tables set forth below.

Within each set of trials, the animals were randomly divided into four groups of five animals each. Within each set, one group was chosen to be fed a control supplement containing 18% salt as an intake limitor with the remaining three groups being fed hydrated lime as an intake limitor at different levels of lime.

Each group of animals within each evaluation was fed a grain-based feed supplement as set forth below in Table 3.

TABLE 3

| Formulation of Grain-Based Supplement |
|---|
| *Animal Group Number (Trial A) |

TABLE 3-continued
Formulation of Grain-Based Supplement

|  | 1 | 2 | 3 | 4 |
|---|---|---|---|---|
| Dehydrated Alfalfa Meal | 5.00 | 5.00 | 5.00 | 5.00 |
| Ground Corn | 70.30 | 68.30 | 66.30 | 57.95 |
| Wheat Middlings | 15.00 | 15.00 | 15.00 | 15.00 |
| Limestone | 1.73 | 1.73 | 1.73 | 1.73 |
| Dicalcium Phosphate | .90 | .90 | .90 | .90 |
| Salt | .65 | .65 | .65 | 18.00 |
| Urea | .67 | .67 | .67 | .67 |
| Magnesium Sulfate | .45 | .45 | .45 | .45 |
| Cattle Vitamin Pmx. | .15 | .15 | .15 | .15 |
| Trace Mineral Premix | .15 | .15 | .15 | .15 |
| Hydrated Lime | 5.00 | 7.00 | 9.00 | 0.00 |
|  | 100.00 | 100.00 | 100.00 | 100.00 |
| Actual Analysis: |  |  |  |  |
| Moisture, % | 11.18 | 11.17 | 11.23 | 9.53 |
| Protein, % | 10.35 | 10.59 | 10.76 | 9.11 |
| Calcium, % | 3.87 | 3.98 | 4.69 | 2.07 |
| Phosphorus, % | .62 | .61 | .59 | .51 |
| Salt, % | 1.53 | 1.22 | 1.03 | 17.45 |

| | Animal Group Number (Trial B) | | | |
|---|---|---|---|---|
|  | 1 | 2 | 3 | 4 |
| Dehydrated Alfalfa Meal | 5.00 | 5.00 | 5.00 | 5.00 |
| Ground Corn | 68.30 | 67.80 | 67.30 | 57.95 |
| Wheat Middlings | 15.00 | 15.00 | 15.00 | 15.00 |
| Limestone | 1.73 | 1.73 | 1.73 | 1.73 |
| Dicalcium Phosphate | .90 | .90 | .90 | .90 |
| Salt | .65 | .65 | .65 | 18.00 |
| Urea | .67 | .67 | .67 | .67 |
| Magnesium Sulfate | .45 | .45 | .45 | .45 |
| Cattle Vitamin Pmx. | .15 | .15 | .15 | .15 |
| Trace Mineral Premix | .15 | .15 | .15 | .15 |
| Hydrated Lime | 7.00 | 7.50 | 8.00 | 0.00 |
|  | 100.00 | 100.00 | 100.00 | 100.00 |
| Actual Analysis: |  |  |  |  |
| Moisture, % | 11.06 | 11.35 | 11.36 | 9.09 |
| Protein, % | 12.14 | 11.25 | 11.15 | 11.39 |
| Calcium, % | 3.44 | 4.50 | 4.47 | 1.87 |
| Phosphorus, % | .58 | .56 | .55 | .52 |
| Salt, % | .74 | .78 | .64 | 16.65 |

| | Animal Group Number (Trial C) | | | |
|---|---|---|---|---|
|  | 1 | 2 | 3 | 4 |
| Dehydrated Alfalfa Meal | 5.00 | 5.00 | 5.00 | 5.00 |
| Ground Corn | 68.30 | 67.30 | 66.30 | 57.95 |
| Wheat Middlings | 15.00 | 15.00 | 15.00 | 15.00 |
| Limestone | 1.73 | 1.73 | 1.73 | 1.73 |
| Dicalcium Phosphate | .90 | .90 | .90 | .90 |
| Salt | .65 | .65 | .65 | 18.00 |
| Urea | .67 | .67 | .67 | .67 |
| Magnesium Sulfate | .45 | .45 | .45 | .45 |
| Cattle Vitamin Pmx. | .15 | .15 | .15 | .15 |
| Trace Mineral Premix | .15 | .15 | .15 | .15 |
| Hydrated Lime | 7.00 | 8.00 | 9.00 | 0.00 |
|  | 100.00 | 100.00 | 100.00 | 100.00 |
| Actual Analysis: |  |  |  |  |
| Moisture, % | 11.97 | 12.18 | 11.76 | 9.95 |
| Protein, % | 11.65 | 11.05 | 11.07 | 9.18 |
| Calcium, % | 3.22 | 3.35 | 3.42 | 2.09 |
| Phosphorus, % | .59 | .54 | .54 | .49 |
| Salt, % | .63 | .72 | .63 | 19.85 |

Each trail was fed the feed supplement indicated in Table 3 for 21 days. Each steer was provided with 8.8 pounds of feed supplement on a daily basis. Calan feeders were used to obtain individual daily animal consumption records. All steers were confined to a half-acre dry lot. Alfalfa haylage and screened corn cobs at a 2:1 ratio were provided during the experiment from a common bunk feeder. The feed supplements indicated in Table 3 were offered in meal form.

Set forth below in Table 4 is a summary of the results of the experiment. The average daily intake is expressed on a dry matter basis by multiplying daily supplement consumption by dry matter content of each supplement.

TABLE 4

| Trial | Animal Group Number | Feed Intake Limiter | Level (%) | Average Daily Intake (lbs.) |
|---|---|---|---|---|
| A | 1 | Hydrated Lime | 5.0 | 5.09 |
| A | 2 | Hydrated Lime | 7.0 | 6.53 |
| A | 3 | Hydrated Lime | 9.0 | 2.38 |
| A | 4 | Salt | 18.0 | 6.51 |
| B | 1 | Hydrated Lime | 7.0 | 7.72 |
| B | 2 | Hydrated Lime | 7.5 | 7.86 |
| B | 3 | Hydrated Lime | 8.0 | 4.23 |
| B | 4 | Salt | 18.0 | 4.70 |
| C | 1 | Hydrated Lime | 7.0 | 6.14 |
| C | 2 | Hydrated Lime | 8.0 | 3.71 |
| C | 3 | Hydrated Lime | 9.0 | 4.10 |
| C | 4 | Salt | 18.0 | 3.98 |

As will be noted, in Trial A, the 9% level of hydrated lime showed a dramatic reduction in average daily intake of feed supplement when compared to the 5% or 7% hydrated lime level (statistically significant, P less than 0.05). The 7% hydrated lime level showed the same intake limiting characteristics of the control which used 18% salt as an intake limitor (statistically similar, P greater than 0.05).

In Trial B, a dramatic intake limiting effect can be seen between the 8% hydrated lime level and the 7½% hydrated lime level (statistically significant, P less than 0.05).

In Trial C, again, there is a dramatic change in intake limiting effect between the 8% or 9% level of hydrated lime and the 7% level of hydrated lime (statistically significant, P less than 0.05).

Although the present invention has been described with reference to preferred embodiments, workers skilled in the art will recognize that changes may be made in form and detail without departing from the spirit and scope of the invention.

What is claimed is:

1. A method of self-feeding animals a feed supplement consisting essentially of:
   feeding the animals calcium hydroxide with a feed supplement in meal form in an amount that is effective in limiting intake of the feed supplement.

2. The method of claim 1 wherein the amount of calcium hydroxide is about 6–15% by weight of the feed supplement.

3. The method of claim 1 wherein the amount of calcium hydroxide is above approximately 7% by weight of the feed supplement.

4. The method of claim 1 wherein the feed supplement is primarily farinaceous materials.

5. The method of claim 1 wherein the feed supplement is primarily grain.

6. The method of claim 1 wherein the feed supplement is primarily corn.

7. The method of claim 1 wherein the feed supplement contains an amount of oil capable of reducing the dusty conditions present during the mixing of the feed supplement.

8. A method of self-feeding animals a feed supplement by limiting intake of feed supplement to an optimum amount consisting essentially of:
   preparing the feed supplement from primarily farinaceous materials in meal form;
   incorporating into said feed supplement a feed intake limiting composition including calcium hydroxide in an amount effective to limit intake of the feed supplement by the animals; and offering the feed supplement containing the feed intake limiting composition to the animals.

9. The method of claim 8 wherein the amount of calcium hydroxide is about 6-15% by weight of the feed supplement.

10. The method of claim 8 wherein the amount of calcium hydroxide is above 7% by weight of the feed supplement.

11. A method of manufacturing a feed supplement for animals containing a feed intake limiting composition consisting essentially of:

preparing the feed supplement of primarily farinaceous materials in meal form; and mixing calcium hydroxide into the feed supplement in an amount effective to limit intake of the feed supplement.

12. The method of claim 11 wherein the amount of calcium hydroxide mixed into the feed supplement is approximately 6-15% by weight of the feed supplement.

13. The method of claim 11 wherein the amount of calcium hydroxide mixed into the feed supplement is above approximately 7% by weight of the feed supplement.

* * * * *